Sept. 8, 1970     G. L. FULLERTON ET AL     3,527,628

METHOD FOR RECLAIMING CATHODE RAY TUBE SCREEN PANELS

Filed July 19, 1967

INVENTORS
GORDON L. FULLERTON,
ALBERT REGENBRECHT, J
THADDEUS V. RYCHLEWSKI

Robert E. Strauss

ATTORNEY

United States Patent Office 3,527,628
Patented Sept. 8, 1970

3,527,628
METHOD FOR RECLAIMING CATHODE RAY TUBE SCREEN PANELS
Gordon L. Fullerton, Le Roy, and Albert Regenbrecht, Jr., and Thaddeus V. Rychlewski, Seneca Falls, N.Y., assignors to Sylvania Electric Products Inc., a corporation of Delaware
Filed July 19, 1967, Ser. No. 654,499
Int. Cl. C03c 15/02
U.S. Cl. 156—6          3 Claims

ABSTRACT OF THE DISCLOSURE

A method for reclaiming cathode ray tube screen panels which have imperfections in the surface of the screen side of the panel. The screen side of the panel is subjected to a uniform blast of pressurized abrasive material to deplete the surface material affected by the imperfection and is then chemically treated and cleaned to provide an appropriate matte finish to thereby permit rescreening of the panel for use in a cathode ray tube. The resultant tube and screen then has uniform illumination and transmission properties.

BACKGROUND OF THE INVENTION

This invention relates generally to cathode ray tubes and more particularly to a method for reclaiming cathode ray tube screen panels which have imperfections in the surface of the screen side of the panel.

In many cathode ray tubes, the phosphor deposited on the inner surface of the screen panel is discontinuous and is not uniformly subjected to the electron beam or beams which are operative to provide the phosphor screen illumination for information display. For example, in the shadow mask cathode ray tube used in cathode ray tubes for color television, the screen comprises a multiplicity of triads of phosphor dots, each triad including a green, a red and a blue phosphor dot. The foraminous shadow mask is positioned between the triad dot screen and three electron gun structure mounted in the neck of the tube. The shadow mask controls the electron beams from each electron gun so that each beam strikes only its respective phosphor dot in each triad.

It has been found that after the screen has been exposed to electron bombardment for several hundred hours, an electron burn occurs on the inside of the screen panel wherever a dot is located. After the cathode ray tube fails, it is desirable to salvage for reuse the glass screen panel because it is relatively expensive item. If the screen panel has not suffered any appreciable electron burn, it is a relatively easy process to remove the old screen of phosphor dots and rescreen the panel. However, if appreciable electron burn has occurred and the panel is rescreened with the electron burn in it, the resultant tube exhibits a poorly reproduced image having an inherently blotchy and wavy pattern. This is due to the fact that the optical properties of the glass, such as light transmission and reflectance, have been altered in the area where electron burn has occurred and when the new screen is placed on the screen panel, it is practically impossible to have the new phosphor dots coincide positionally with the old phosphor dots.

In addition to having altered optical properties in the area of the electron burn, it has been found that the physical and chemical properties of the glass have also been changed. As a result the glass in the area of the electron burn is quite resistant to chemical attack, such as by acid etching for example. Therefore, it has become the practice to discard screen panels exhibiting appreciable electron burn on the screening surface since it has been generally considered impractical to salvage such panels for reuse. However, as mentioned above, the cost of a screen panel constitutes a signfiicant part of the cost of the cathode ray tube and if more screen panels can be recovered, the cost of rebuilt tubes will be accordingly reduced.

In some instances, new glass panels are found to have scratches, buff marks or blisters in the surface of the screen side of the panel, which also render the panel non-usable. Attempts have been made to grind and polish the surface to remove such imperfections. However, they have not been found practical because it is necessary to use large grinding and polishing wheels, i.e. 6"–8" in diameter, which cannot get into the corners of the tube. As a result the screening surface of the panel is non-uniform when so treated and hence cannot be used.

OBJECTS AND SUMMARY OF THE INVENTION

Therefore, it is an object of this invention to provide a method for reclaiming cathode ray tube screen panels which have imperfections in the surface of the screen side of the panel.

Another object of this invention is to provide a method for reclaiming cathode ray tube screen panels which is relatively inexpensive, yet results in a screen panel having a highly uniform screening surface.

The foregoing objects are achieved in one aspect of the invention through a method wherein the screening surface of the screen panel is subjected to a vapor blast of an abrasive material to remove therefrom the layer of the screening surface affected by the electron burn. The surface is then washed and chemically treated to provide the desired uniformity required to permit rescreening of the screen panel.

DESCRIPTION OF THE PREFERRED EMBODIMENTS

For a better understanding of the present invention, together with other and further objects, advantages and capabilities thereof, reference is made to the following disclosure and appended claims in connection with the above described drawings.

The invention will be illustrated by describing the manner in which screen panels exhibiting electron burn in the surface of the screen side of the panel are treated to produce panels which may be reused. However, the same methods apply to panels which have scratches, buff marks, blisters or other imperfections in the screen surface of the panel, and such as intended to be within the scope of the present invention.

Figure 1:
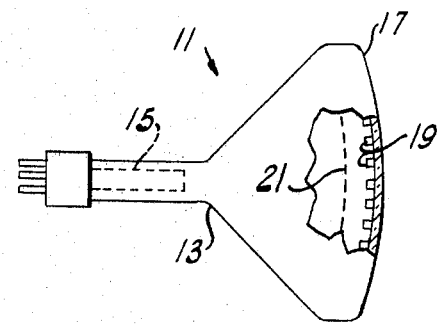
FIG. 1 is a side view partially in section of a typical shadow mask color cathode ray tube.

There is shown in FIG. 1 a tyical color cathode ray tube 11 comprising an envelope 13, a neck portion of which contains a three electron gun structure 15. The glass screen panel 17 having a phosphor screen comprising a multiplicity of phosphor dots 19 on its inner surface mates with the tube envelope 13. A foraminous shadow mask 21 mounted within the tube between the phosphor screen and the electron gun structure 15 assures that each of the beams from the electron guns will strike only its respective color phosphor dots.

Figure 2:
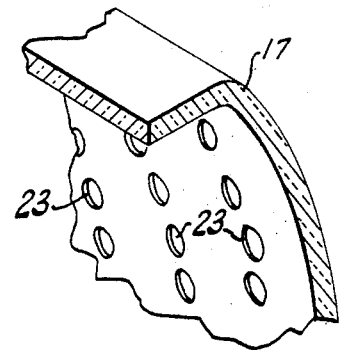
FIG. 2 is an enlarged sectional view of a portion of the screen panel of a cathode ray tube showing areas of electron burn.
Figure 3:
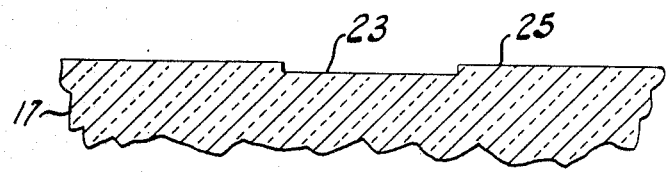
FIG. 3 is an enlarged cross-sectional view of a portion of screen panel of a cathode ray tube.

FIG. 2 shows a portion of the glass screen panel 17 exhibiting electron burn. The panel has been disconnected from the tube envelope and the old color dot phosphor screen has been removed from the panel. The electron burn appears as voids 23, generally cylindrical in shape, in the inner surface of the panel. As mentioned above, the surface glass in the area of the electron burn exhibits altered optical, chemical and physical properties. For example, the optical transmission and reflectance properties are reduced, the glass is less susceptible to chemical attack and becomes physically hard. One theory is that some of the electrons penetrate the surface of the glass giving up their energy to interior atoms, thereby changing the atomic structure of the glass surface in the region of the electron burn. Also, as shown in FIG. 3, the surface 25 of the glass 17 is eroded in the region of the electron burn. These changes are believed to affect only a few hundred angstroms of thickness of the glass. However, before the glass panel may be reused, the damaged surface must be removed.

Figure 4:
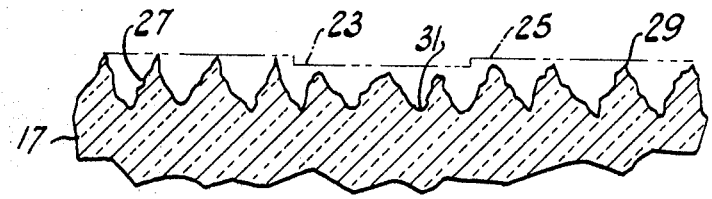
FIG. 4 is an enlarged cross-sectional view of a portion of a screen panel of a cathode ray tube after being subjected to a blasting by abrasive particles.
Figure 5:
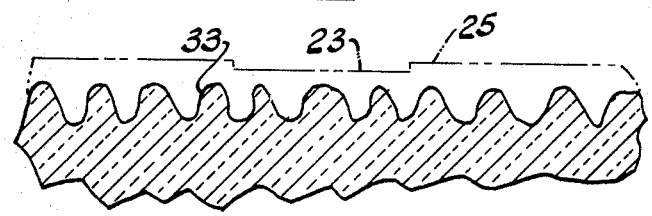
FIG. 5 is an enlarged cross-sectional view of a portion of a screen panel of a cathode ray tube after abrasive processing and treatment with an etching solution.

According to the present invention, after removal of the old phosphor screen from the inside of the panel, the screening surface is inspected to see if appreciable electron burn has occurred. If a panel has experienced appreciable electron burn, the entire inside surface of the panel is uniformly subject to a blast of abrasive particles, thereby changing the surface structure of the panel from that shown in FIG. 3, to the configuration illustrated in FIG. 4. As seen in FIG. 4, the old surface 25 including the region of the electron burn 23 has been cut away by the abrasive particles leaving a roughened surface 27 having pronounced peaks 29 and valleys 31. The surface at this point is too rough and uneven to permit rescreening, but with the removal of the portions affected by the electron burn, it has been found that the surface 27 is then uniformly subject to chemical attack. Therefore, the surface 27 is rinsed with water and washed with a suitable chemical solution, such as hydrofluoric acid, for a predetermined period of time. This results in a smoother matte surface 33, as illustrated in FIG. 5, which is readily adapted to be rescreened.

It has been found that either vapor blasting or sand blasting techniques are suitable for subjecting the screening surface to a blast of abrasive particles. Many types of abrasive materials, such as $SiO_2$, $Al_2O_3$ and SiC, may be used as long as the hardness of the particles exceeds the hardness of the glass. Preferably, the particle size is 150 mesh or smaller. In particular, 320 mesh $Al_2O_3$ particles have been found to provide excellent results when used in a vapor blast machine.

Many chemical solutions are known to be suitable for washing the screening surface after it has been subjected to the blast of abrasive particles and rinsed with water. A preferred technique is to wash the screening surface for about 15 seconds with a hydrofluoric acid solution having a strength between 17% and 25%. In some instances it may be desired to use the more standard ten percent hydrofluoric acid solution as the washing agent. However, the latter solution in reacting with the glass tends to form an insoluble precipitant, necessitating a scrubbing of the screening surface after treatment with the acid to remove the precipitant. In addition, basic etchants such as sodium hydroxide or potassium hydroxide have been found to produce acceptable results, although they generally require a longer etching time.

It is, therefore, apparent that applicants have devised methods for salvaging for reuse screen panels exhibiting electron burn or other surface imperfections which have heretofore been considered useless. The methods disclosed are relatively efficient and quite inexpensive and result in a net decrease in the cost of rebuilt tubes.

While there have been shown and described what are at present considered the preferred embodiments of the invention, it will be obvious to those skilled in the art that varrious changes and modifications may be made therein without departing from the scope of the invention as defined by the appended claims.

We claim:
1. A method of reclaiming the glass screen panel for a cathode ray tube wherein the screen surface of said panel contains imperfections which renders the panel unfit for use, said method comprising:
   directing a blast of abrasive material uniformly over the screen side of said panel wherein said abrasive material is chosen from the group consisting of $SiO_2$, $Al_2O_3$ and SiC and the size thereof is less than 150 mesh;
   washing the screen side of said panel with water to remove said abrasive material;
   rinsing the screen side of said panel with a hydrofluoric acid solution having a strength between 17% and 25%; and rewashing the screen side of said panel with water.
2. A method of reclaiming the glass screen panel for a cathode ray tube wherein the screen surface of said panel has become deformed as a result of electron burn, said method comprising:
   directing a vapor blast of abrasive material uniformly over the screen side of said panel wherein said abrasive material is $Al_2O_3$ and the size thereof is less than 150 mesh;
   washing the screen side of said panel with water to remove said abrasive material;
   rinsing the screen side of said panel with a hydrofluoric acid solution having a strength between 17% and 25%, and rewashing the screen side of said panel.
3. The invention according to claim 2 additionally comprising the steps of:
   scrubbing the entire screen side of said panel; and
   rewashing the screen side of said panel with water to insure the removal of all insoluble precipitants that may have been formed thereon during the step of rinsing the screen surface of said panel with a hydrofluoric acid solution.

References Cited
UNITED STATES PATENTS 2,999,013   9/1961   Meth _____ 156—6

JACOB H. STEINBERG, Primary Examiner

U.S. Cl. X.R.

65—31; 156—24, 25